United States Patent [19]

Dunworth

[11] 4,332,910
[45] Jun. 1, 1982

[54] FREE FLOWING METALLURGICAL WELL POWDER

[75] Inventor: Bruce E. Dunworth, Nashport, Ohio

[73] Assignee: Ferro Corporation, Cleveland, Ohio

[21] Appl. No.: 239,196

[22] Filed: Mar. 2, 1981

[51] Int. Cl.³ .............................................. C04B 35/48
[52] U.S. Cl. .................................................... 501/106
[58] Field of Search ................................ 501/106, 107

[56] References Cited

U.S. PATENT DOCUMENTS 2,633,623  4/1953  Robinson ............................. 501/106

Primary Examiner—James Poer
Attorney, Agent, or Firm—Milton L. Simmons

[57] ABSTRACT

There is provided a metallurgical well powder having reduced tendencies to hinder the flow of molten metal, by packing and jamming the opening, in a steel ladle for example, through which said molten metal will be teemed upon tapping said ladle.

12 Claims, No Drawings

FREE FLOWING METALLURGICAL WELL POWDER

As is well known in the metallurgical industry, ladles for holding and teeming molten metal, such as steel for example, must utilize some sort of particulate refractory barrier and insulator to separate the molten metal within the refractory-lined ladle, from direct contact with the gate system which, when opened, initiates the flow of metal from the ladle.

Stated another way, there is interposed, in the drain well of the ladle, between the slide gate system and the contained molten metal, a highly refractory, insulating "plug" composed of discrete, refractory particles which must meet certain physical and chemical criteria in order to serve their intended purpose; this refractory is commonly called a "well powder".

In operation, when the slide gate system is opened, the weight of the molten metal simply flushes out the well powder, permitting the balance of the molten metal to quickly and easily flow through the well.

Heretofore, one of the most popular refractory powders utilized, has been natural zircon sand.

However, zircon sand has the disadvantage of not being consistently free-flowing under a head of heavy, molten metal, causing partial or complete blockage of the slide gate bore, necessitating the use of an oxygen lance to free the obstruction. Obviously, the latter is an extremely hazardous, as well as expensive and time-consuming, operation.

It is therefore an object of this invention to provide a metallurgical well powder which is consistently free-flowing when utilized for its intended application.

It is yet another object of this invention to provide a method for preparing a free-flowing well powder.

It is also an object to provide a free-flowing well powder having the compositional and physical characteristics as hereinafter claimed.

And it is finally an object of this invention to provide a method of manufacturing a free-flowing well powder having the compositional range as hereinafter claimed.

DESCRIPTION OF THE INVENTION

Briefly stated, the free-flowing well powder of this invention is a pelletized, or pelletized and sintered, admixture of zircon sand and zircon, of predetermined particle size, said end product having a final particle size ranging from 6 to 80 mesh (Tyler series).

PREFERRED EMBODIMENT

The following batch was thoroughly admixed and dispersed with water using conventional techniques:

|  | Wt. % |
| --- | --- |
| Zircon sand (80 to 200 mesh) | 35 |
| Zircon <325 mesh | 55 |
| Zircon <600 mesh | 10 |
| Dry Lignosulphonate (Binder) | 1 (added) |
| Water | 5.2 (added) |

After the addition of water and organic binder, the foregoing mixture was pelletized, using a standard, disc-type pelletizer, following which the pellets were dried to less than 0.5 wt. % water.

The dried, pelletized material was then processed through a rotary smelter, preheated, and maintained, at a temperature of approximately 2500° F., for approximately 45 minutes.

The sintered pellets were then discharged from the smelter and allowed to cool to room temperature.

The granular, sintered material was then fed onto a 6 mesh screen comprising the top screen of a shaker screen battery, the bottom screen being 80 mesh.

Minus 80 mesh material may be reused in subsequent pre-sinter batches, the plus 6 mesh material crushed to the 6 to 80 mesh preferred screen size.

The preferred size distribution range is set forth below, along with the actual distribution of the above embodiment:

|  | Range (Wt. %) | Preferred (Wt. %) |
| --- | --- | --- |
| −6 mesh | 100.0 | 100 |
| 6 to 8 mesh | 12.0 max. | 5 |
| 8 to 14 mesh | 40–60 | 45 |
| 14 to 28 mesh | 30–45 | 47 |
| 28 to 65 mesh | 0–10 | 5 |
| −65 mesh | 5 max. | 3 |
| −80 mesh | 0 | 0 |

Set forth below is the broad working range of composition of subject invention:

| | |
| --- | --- |
| natural zircon sand (80 to 200 mesh) | 25 to 60% by wt. |
| zircon, <325 mesh | 40 to 70% by wt. |
| zircon, <600 mesh | 0 to 15% by wt. |

A narrower preferred range of composition would be:

| | |
| --- | --- |
| natural zircon sand (80 to 200 mesh) | 35 to 50% by wt. |
| zircon, <325 mesh | 50 to 60% by wt. |
| zircon, <600 mesh | 7.5 to 12.5% by wt. |

Since the organic binder and water are added solely to provide a temporary binder for pelletizing, the organic binder being completely burnt off during the sintering operation, the binder and water content do not comprise critical aspects of the invention and may be varied within appropriate limits to provide suitable pellets.

Examples of dry binders, in addition to lignosulphonate, would be carboxy methylcellulose and any of various gums. Binders pre-mixed with water are exemplified by polyvinyl alcohol and methyl cellulose.

The sintering temperature may also vary from 2000° F. to 3000° F. depending upon the original composition.

Suffice is to say that whatever temperature provides a fairly coherent pellet would be considered optimum; excessive fusion or vitrification to be avoided since it would only make sizing and subsequent grinding more difficult, and likely render the material inoperative.

The sized material, following sintering according to the above procedures, produces a free-flowing well powder that consistently flushes completely free of the slide gate bore when a ladle is tapped, completely eliminating the problems associated with the prior material utilized as described above.

Furthermore, it has been determined that, quite surprisingly, the sintering step set forth above is not always absolutely essential.

That is, following pelletizing and drying, the pellets may be screened and sized within the range set forth above, with the resultant material found to be highly successful as a consistently free-flowing well powder in its pre-sintered state.

Although I have no wish to be bound by the following theory, as to why the unsintered material functions successfully, it is possible that the heat of the molten metal, in direct contact with the unsintered well powder of this invention, performs something of an in situ, incipient sintering of the particles such that they perform essentially as though they have been previously sintered, to thereby impart to them the free-flowing quality, upon tapping of the ladle, which renders them so outstanding for their intended purpose.

Therefore, sintering is optional, depending upon inventory practices of a given mill.

That is, if the unsintered material is stored prior to use for extended periods, there would be a tendency of the organic binder to absorb water, causing the pellets to pack and agglomerate, in which case the sintered product would be preferred.

I claim:

1. A free-flowing, pelletized, metallurgical well powder having essentially the following composition:

| | |
|---|---|
| natural zircon sand (80 to 200 mesh) | 25 to 60% by wt. |
| zircon, <325 mesh | 40 to 70% by wt. |
| zircon, <600 mesh | 0 to 15% by wt. |

2. A free-flowing, pelletized, metallurgical well powder having essentially the following composition:

| | |
|---|---|
| natural zircon sand (80 to 200 mesh) | 35 to 50% by wt. |
| zircon, <325 mesh | 50 to 60% by wt. |
| zircon, <600 mesh | 7.5 to 12.5% by wt. |

3. A free-flowing, pelletized, sintered, metallurgical well powder having essentially the following composition:

| | |
|---|---|
| natural zircon sand (80 to 200 mesh) | 25 to 60% by wt. |
| zircon, <325 mesh | 40 to 70% by wt. |
| zircon, <600 mesh | 0 to 15% by wt. |

4. A free-flowing, pelletized, sintered, metallurgical well powder having essentially the following composition:

| | |
|---|---|
| natural zircon sand (80 to 200 mesh) | 35 to 50% by wt. |
| zircon, <325 mesh | 50 to 60% by wt. |
| zircon, <600 mesh | 7.5 to 12.5% by wt. |

5. A free flowing, sized, pelletized, metallurgical well powder having essentially the following components present as a compacted, thoroughly admixed interspersion thereof:

| | |
|---|---|
| natural zircon sand (80 to 200 mesh) | 25 to 60% by wt. |
| zircon, <325 mesh | 40 to 70% by wt. |
| zircon, <600 mesh | 0 to 15% by wt. | said, pelletized, particulate well powder composition having the following fines distribution following sizing:

| | Range (Wt. %) |
|---|---|
| −6 mesh | 100.0 |
| 6 to 8 mesh | 12.0 max. |
| 8 to 14 mesh | 40–60 |
| 14 to 28 mesh | 30–45 |
| 28 to 65 mesh | 0–10 |
| −65 mesh | 5 max. |
| −80 mesh | 0 |

6. A free-flowing, sized, pelletized, metallurgical well powder having essentially the following components present as a compacted, thoroughly admixed interspersion thereof:

| | |
|---|---|
| natural zircon sand (80 to 200 mesh) | 35 to 50% by wt. |
| zircon, <325 mesh | 50 to 60% by wt. |
| zircon, <600 mesh | 7.5 to 12.5% by wt. | said pelletized, particulate well powder composition having the following fines distribution following sizing:

| | Range (Wt. %) |
|---|---|
| −6 mesh | 100.0 |
| 6 to 8 mesh | 12.0 max. |
| 8 to 14 mesh | 40–60 |
| 14 to 28 mesh | 30–45 |
| 28 to 65 mesh | 0–10 |
| −65 mesh | 5 max. |
| −80 mesh | 0 |

7. The well powder of claim 1 which has been sintered.

8. The well powder of claim 2 which has been sintered.

9. The well powder of claim 5 which has been sintered prior to sizing.

10. The well powder of claim 6 which has been sintered prior to sizing.

11. The method of producing a free-flowing, sized, pelletized, metallurgical well powder comprising the following steps:

a. Thoroughly admixing and interspersing the following components in their respective amounts as indicated:

| | |
|---|---|
| natural zircon sand (80 to 200 mesh) | 25 to 60% by wt. |
| zircon, <325 mesh | 40 to 70% by wt. |
| zircon, <600 mesh | 0 to 15% by wt. | b. Compacting and pelletizing the admixture of step (a)

c. Fragmenting and sizing the pellets of step (b) to a particulate composition having the following fines distribution:

| | Range (Wt. %) |
|---|---|
| −6 mesh | 100.0 |
| 6 to 8 mesh | 12.0 max. |
| 8 to 14 mesh | 40–60 |
| 14 to 28 mesh | 30–45 |
| 28 to 65 mesh | 0–10 |

| | Range (Wt. %) |
|---|---|
| −65 mesh | 5 max. |
| −80 mesh | 0 | to provide a metallurgical well powder for protecting the slide gate system of a metallurgical ladle from molten metal contained therein.

12. The method of producing a free-flowing, sized, pelletized, metallurgical well powder comprising the following steps:

a. Thoroughly admixing and interspersing the following components in their respective amounts as indicated:

| | |
|---|---|
| natural zircon sand (80 to 200 mesh) | 25 to 60% by wt. |
| zircon, <325 mesh | 40 to 70% by wt. |
| zircon, <600 mesh | 0 to 15% by wt. | b. Compacting and pelletizing the admixture of step (a)
c. Sintering the pelletized admixture to step (b)
d. Fragmenting and sizing the pellets of step (c) to a particulate composition having the following fines distribution:

| | Range (Wt. %) |
|---|---|
| −6 mesh | 100.0 |
| 6 to 8 mesh | 12.0 max. |
| 8 to 14 mesh | 40–60 |
| 14 to 28 mesh | 30–45 |
| 28 to 65 mesh | 0–10 |
| −65 mesh | 5 max. |
| −80 mesh | 0 | to provide a metallurgical well powder for protecting the slide gate system of a metallurgical ladle from molten metal contained therein.

* * * * *